United States Patent
Kolhouse et al.

(10) Patent No.: US 12,497,927 B2
(45) Date of Patent: *Dec. 16, 2025

(54) SYSTEMS AND METHODS FOR FILTER REGENERATION WITH CYLINDER DEACTIVATION

(71) Applicants: Cummins Inc., Columbus, IN (US); Tula Technology, Inc., San Jose, CA (US)

(72) Inventors: J. Steven Kolhouse, Columbus, IN (US); David Langenderfer, Columbus, IN (US); David Schmidt, Indianapolis, IN (US); Vijay Srinivasan, San Jose, CA (US)

(73) Assignees: Cummins Inc., Columbus, IN (US); Tula Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/582,574

(22) Filed: Feb. 20, 2024

(65) Prior Publication Data

US 2024/0191667 A1 Jun. 13, 2024

Related U.S. Application Data

(63) Continuation of application No. 17/843,473, filed on Jun. 17, 2022, now Pat. No. 11,933,237.

(51) Int. Cl.
*F02D 41/02* (2006.01)
*F01N 3/023* (2006.01)
(Continued)

(52) U.S. Cl.
CPC ....... *F02D 41/029* (2013.01); *F02D 41/0087* (2013.01); *F02D 41/1448* (2013.01);
(Continued)

(58) Field of Classification Search
CPC ........ F01N 3/023; F01N 3/0233; F01N 3/038; F01N 3/025; F01N 3/0253; F01N 3/0864;
(Continued)

(56) References Cited

U.S. PATENT DOCUMENTS 10,570,840 B2 2/2020 Lyon et al.
11,008,953 B2 5/2021 Desai et al.
(Continued)

FOREIGN PATENT DOCUMENTS

WO WO-2015/035133 A1 3/2015
WO WO-2020/076440 A1 4/2020

OTHER PUBLICATIONS

Non-Final Office Action on U.S. Appl. No. 17/843,473 DTD May 11, 2023.
(Continued)

*Primary Examiner* — Binh Q Tran
(74) *Attorney, Agent, or Firm* — Foley & Lardner LLP

(57) ABSTRACT

A system includes an exhaust aftertreatment system including a particulate filter and a controller. The controller is configured to: receive information comprising a temperature regarding a filter of the aftertreatment system; and responsive to determining that the temperature regarding the filter is below a temperature threshold, command the engine to operate according to a first firing fraction. The first firing fraction may define a number of active cylinders of the engine relative to a total number of cylinders of the engine, and correspond to a predetermined temperature value of the filter.

20 Claims, 5 Drawing Sheets

(51) Int. Cl.
*F01N 3/08* (2006.01)
*F01N 9/00* (2006.01)
*F01N 11/00* (2006.01)
*F02D 41/00* (2006.01)
*F02D 41/14* (2006.01)

(52) U.S. Cl.
CPC ........ *F02D 41/1454* (2013.01); *F01N 3/0233* (2013.01); *F01N 3/0864* (2013.01); *F01N 9/002* (2013.01); *F01N 9/005* (2013.01); *F01N 11/002* (2013.01); *F01N 11/005* (2013.01); *F01N 2430/02* (2013.01); *F01N 2430/06* (2013.01); *F01N 2430/08* (2013.01); *F01N 2430/085* (2013.01); *F01N 2430/10* (2013.01); *F01N 2550/04* (2013.01); *F01N 2560/025* (2013.01); *F01N 2900/0418* (2013.01); *F01N 2900/0421* (2013.01); *F01N 2900/0422* (2013.01); *F01N 2900/1606* (2013.01); *F01N 2900/1611* (2013.01); *F01N 2900/1806* (2013.01); *F02D 2200/021* (2013.01); *F02D 2200/701* (2013.01)

(58) Field of Classification Search
CPC ........ F01N 3/2093; F01N 3/0892; F01N 3/24; F01N 3/36; F01N 9/00; F01N 9/002; F01N 9/005; F01N 9/007; F01N 11/007; F01N 11/002; F01N 11/005; F01N 2240/38; F01N 2430/02; F01N 2430/06; F01N 2430/08; F01N 2430/085; F01N 2430/10; F01N 2550/00; F01N 2550/04; F01N 2550/12; F01N 2560/025; F01N 2570/16; F01N 2900/0416; F01N 2900/0418; F01N 2900/0421; F01N 2900/0422; F01N 2900/1606; F01N 2900/1611; F01N 2900/1624; F01N 2900/1806; F01N 2900/1808; F01N 2900/1821; B01D 46/00; B01D 46/0057; B01D 46/0058; B01D 46/006; B01D 46/0061; B01D 46/0063; B01D 46/448; B01D 2251/102; B01D 2251/11; B01D 2259/40007; B01D 2259/40011; F02D 41/008; F02D 41/0087; F02D 41/009; F02D 41/0095; F02D 41/027; F02D 41/029; F02D 41/1448; F02D 41/1454; F02D 2200/0812; F02D 2200/021; F02D 2200/701; F02D 13/06; F02D 17/00; F02D 17/02

See application file for complete search history.

(56) References Cited

U.S. PATENT DOCUMENTS

| | | | |
|---|---|---|---|
| 11,118,491 B1* | 9/2021 | Gough | F02D 41/0007 |
| 11,933,237 B2* | 3/2024 | Kolhouse | F01N 3/021 |
| 2010/0223910 A1* | 9/2010 | Funk | F02D 41/405 |
| | | | 60/277 |
| 2014/0041362 A1* | 2/2014 | Ulrey | F02D 37/02 |
| | | | 60/287 |
| 2015/0121852 A1 | 5/2015 | Wilson | |
| 2015/0369180 A1 | 12/2015 | Leone et al. | |
| 2017/0130630 A1* | 5/2017 | Younkins | F01N 13/009 |
| 2017/0184003 A1 | 6/2017 | Kogo et al. | |
| 2019/0017423 A1 | 1/2019 | Martin et al. | |
| 2019/0024552 A1 | 1/2019 | Uhrich et al. | |
| 2019/0032585 A1 | 1/2019 | Kelly et al. | |
| 2019/0078524 A1 | 3/2019 | Suchta et al. | |
| 2019/0226378 A1* | 7/2019 | Chen | F01N 9/00 |
| 2020/0200136 A1* | 6/2020 | Badger | F02N 11/0829 |
| 2021/0316715 A1 | 10/2021 | Nose et al. | |
| 2022/0219675 A1* | 7/2022 | Miura | B60W 10/08 |

OTHER PUBLICATIONS

Notice of Allowance on U.S. Appl. No. 17/843,473 DTD Nov. 15, 2023.

\* cited by examiner

SYSTEMS AND METHODS FOR FILTER REGENERATION WITH CYLINDER DEACTIVATION

CROSS-REFERENCE TO RELATED APPLICATION

This application is a continuation of U.S. patent application Ser. No. 17/843,473, filed Jun. 17, 2022, which is incorporated herein by reference in its entirety.

TECHNICAL FIELD

The present disclosure relates to systems and methods for particulate filter regeneration. More particularly, the systems and methods of the present disclosure relate to utilizing cylinder deactivation (CDA) to reduce the likelihood of damage to a particulate filter during regeneration and to assist with or enable regeneration of the particulate filter.

BACKGROUND

Engine exhaust systems including particulate filters (e.g., diesel particulate filter, etc.) utilize particulate filter regeneration to prevent particulate matter from clogging the particular filter. Regeneration may be used to burn the particulate matter, such as soot, from the particulate filter to unclog the filter and enable improved flow there-through. Periodic regeneration of the particulate filter may promote desired emissions characteristics from engine exhaust systems. However, regeneration results in elevated temperatures within the aftertreatment system that can cause damage to various components.

SUMMARY

One embodiment relates to a system. The system includes an exhaust aftertreatment system including a particulate filter and a controller coupled to an engine and the exhaust aftertreatment system. The controller is configured to: receive a particulate filter regeneration event trigger; receive information, the information including a temperature regarding the particulate filter; determine the temperature regarding the particulate filter is below a temperature threshold associated with a particulate filter regeneration event; and responsive to determining the temperature regarding the particulate filter is below the temperature threshold, command the engine to operate in a cylinder deactivation mode, whereby at least one cylinder of a plurality of cylinders of the engine is deactivated.

Another embodiment relates to a method. The method includes: receiving a particulate filter regeneration event trigger regarding a system including an engine coupled to an exhaust aftertreatment system, the exhaust aftertreatment system including a particulate filter; receiving information including a temperature regarding the particulate filter; determining the temperature regarding the particulate filter is below a temperature threshold associated with a particulate filter regeneration event; and responsive to determining that the temperature regarding the particulate filter is below the temperature threshold, commanding the engine to operate in a cylinder deactivation mode whereby at least one cylinder of a plurality of cylinders of the engine is deactivated.

Another embodiment relates to a system structured to regenerate a particulate filter. The system includes a processor and a memory coupled to the processor. The memory stores instructions therein that, when executed by the processor, cause operations including: receiving a particulate filter regeneration event trigger regarding a system comprising an engine coupled to an exhaust aftertreatment system, the exhaust aftertreatment system including a particulate filter; receiving information including a temperature regarding the particulate filter; determining the temperature regarding the particulate filter is below a temperature threshold associated with a particulate filter regeneration event; and responsive to determining that the temperature regarding the particulate filter is below the temperature threshold, commanding the engine to operate in a cylinder deactivation mode whereby at least one cylinder of a plurality of cylinders of the engine is deactivated.

This summary is illustrative only and is not intended to be in any way limiting. The described features, structures, advantages, and/or characteristics of the subject matter of the present disclosure may be combined in any suitable manner in one or more embodiments and/or implementations. In this regard, numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
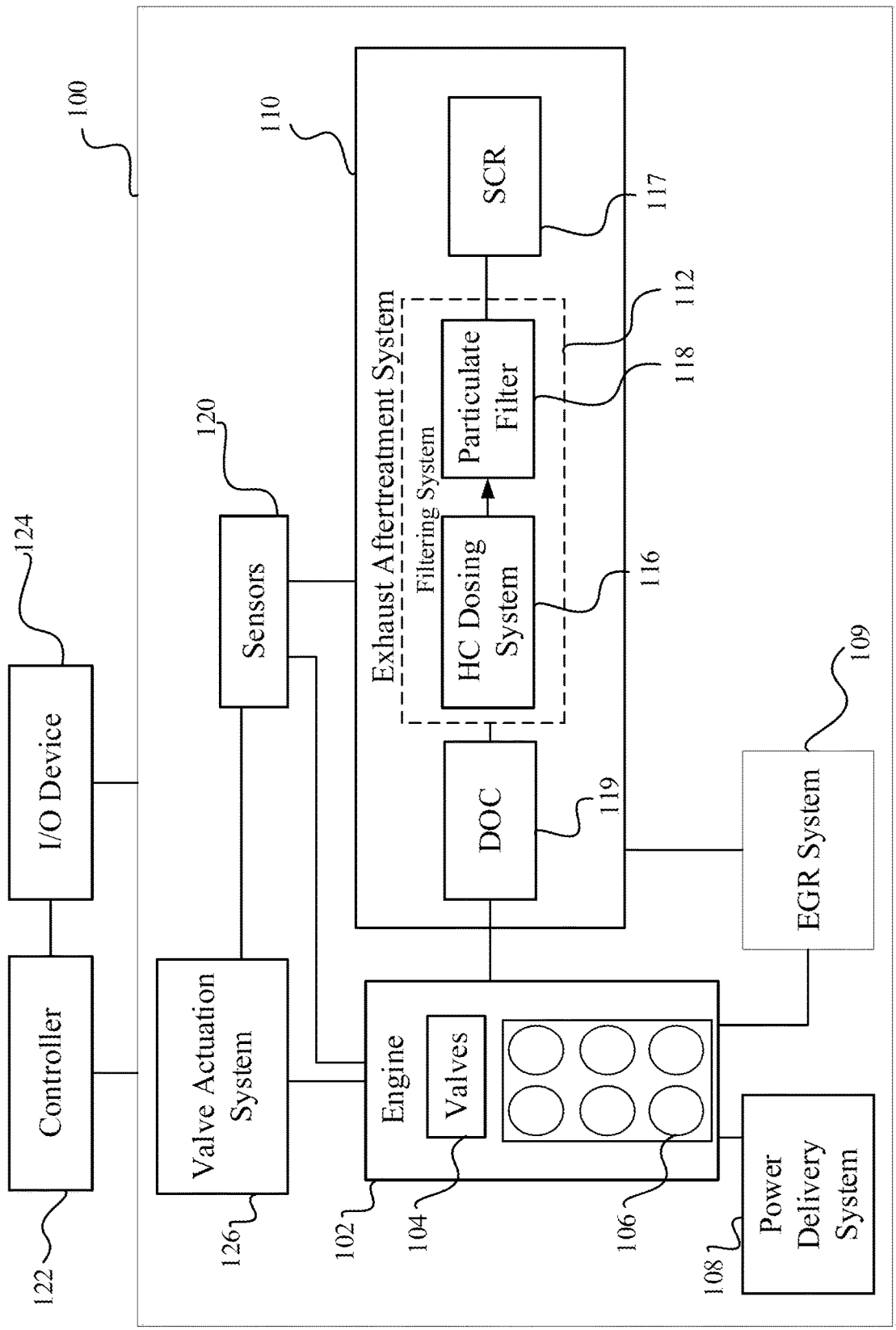
FIG. 1 is a schematic diagram of an engine system with a controller, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the Figures, the various embodiments disclosed herein relate to systems, apparatuses, and methods for employing a cylinder deactivation mode for an engine to control the temperature and oxygen content of exhaust gas and/or system component temperatures during a particulate filter regeneration event to decrease fuel consumption that may be associated with cylinder post-injection fueling events, at least partially enable regeneration of the particulate filter, and to decrease the risk of a thermal runaway in a particulate filter of an exhaust aftertreatment system.

Cylinder deactivation (CDA) mode is a broad term that encompasses various related but distinct cylinder deactivation operating modes. A first type of CDA operating mode is known as "fixed cylinder CDA." In a fixed cylinder CDA operating mode, the same cylinder(s) are active/inactive each engine cycle during the fixed cylinder CDA operating mode. A second type of CDA operating mode is known as "skip-fire" or "dynamic skip-fire" (DSF) operating mode. In a DSF CDA mode, one or more cylinders are deactivated/inactive (e.g., combustion does not occur) on a cycle-by-cycle basis. Accordingly, a cylinder may be inactive for a first engine cycle and active for a second engine cycle. An "active" cylinder means that combustion is allowed to occur in that cylinder. An "inactive" or "deactivated" cylinder means that combustion is not allowed to occur in that cylinder. The present disclosure is applicable with each type of CDA operating mode, and the term CDA mode or CDA operating mode is meant to encompass all such operating modes unless indicated otherwise.

During engine operation, particulate filters (e.g., a diesel particulate filter (DPF), etc.) trap particulate matter (PM), such as soot and ash, generated during a combustion of fuel. In one embodiment, the particulate filter may be constructed from a ceramic material that is formed into a honeycomb structure. In use, the structure may fill with PM as it captures PM. Over time, the particulate filter may become saturated with PM such that the particulate filter may no longer function as desired (e.g., exhaust gas flow rates may be below a predefined flow rate threshold, etc.). To alleviate this occurrence, PM may need to be burned off of the particulate filter, which is known as "particle filter regeneration," by raising the temperature within the particulate filter above a threshold temperature. In some embodiments, the threshold temperature is greater than or equal to approximately 500 degrees Celsius. Regeneration requires oxygen to combust the PM. However, certain conditions during regeneration can lead to temperature runaway (also known as thermal runaway), during which the temperature within the particulate filter increases uncontrollably. Thermal runaway occurs when an excess of combustible materials produces temperatures that are higher than intended and can result in permanent damage to the particulate filter. In this regard, temperature runaway may raise the temperature within the particulate filter to a level that may damage the particulate filter. Moreover and given the relatively high temperatures that may be needed for regeneration, in some embodiments, post-injection is commanded. However, significant amounts of fuel may be required for post-injection, which adversely affects fuel economy. Thus, it is desirable to maintain the temperature of the particulate filter to guard against potential thermal runaway events and minimize fuel consumption via post-injection activities.

As described herein, a controller receives or determines a particulate filter regeneration event trigger. For example, the controller may receive data corresponding to a pressure differential across a particulate filter being above a predetermined threshold, which indicates that the particulate filter is clogged beyond an acceptable threshold level. As another example, a user input may be provided to command a particulate filter regeneration. Based on the particulate filter regeneration event trigger, the controller may implement a particulate filter regeneration event to restore the effectiveness of the particulate filter. In some embodiments and as part of the regeneration event, the controller may command a hydro-carbon post-injection event (an injection of fuel downstream of the engine) that is intended to combust and raise temperatures within the exhaust aftertreatment system. Additionally or alternatively, the controller may increase an engine speed, engine torque, etc., activate a heater, and/or various other thermal management actions to raise temperatures and cause regeneration of the filter. Subsequently or concurrently, the controller may determine system operations for the particulate filter regeneration event. For example, the controller may determine a CDA operating mode that increases the exhaust temperature to a temperature above a desired predefined temperature threshold for particulate filter regeneration. Further, the controller may implement a particular CDA operating mode, such as a DSF operating mode or a fixed cylinder CDA, to control the oxygen content in the particulate filter. Activating the CDA operating mode may increase the exhaust gas temperature exiting the engine, thus raising the temperature within the particulate filter and allowing for the particulate filter regeneration event to occur. Further, the utilization of CDA to regenerate the filter may control oxygen levels in the aftertreatment system to prevent thermal runaway and damage to the filter.

As used herein, the phrases "standard" or "normal" as used with respect to describing operation of an engine refers to the engine operating with all cylinders active (e.g., CDA mode is not operating). For example, if an internal combustion engine has six cylinders, all six cylinders are active. As used herein and in one embodiment, the phrase "firing fraction" as used with respect to the cylinders of an engine and CDA operating mode refers to the number of cylinders active as a fraction of the total number of cylinders available. For example and in this embodiment, a firing fraction of 4/6 refers to four cylinders being active out of a total of six cylinders. In another embodiment, "firing fraction" refers to the times the cylinders are fired divided by the number of firing opportunities (e.g., number of engine cycles multiplied by the number of cylinders in the engine). For example, if a 6-cylinder engine is fired 9 times in 3 engine cycles, the firing fraction is 9/18 or ½. Firing fraction adjustments allow for the number of cylinders being fired (on average) to be modified by a fractional amount instead of a whole number. For example, a firing fraction may change from ⅓ to ⅖ which is equivalent to, in a 6-cylinder engine, increasing from 2 cylinders to 2.4 cylinders.

As also used herein, the phrases "typical operating pattern" or "normal operating pattern" as used with respect to describing operation of valves refers to standard valve timing in an internal combustion engine. For example, during an intake stroke, the intake valve is open to allow for the cylinder to draw in a charge and the exhaust valve is closed to prevent the same contents or trapped contents from escaping. A valve operating "outside of the typical operating pattern" refers to a valve being open or closed outside of standard valve timing. For example, an exhaust valve would be operating outside of the typical operating pattern if it were open during an intake stroke of a cylinder. Engines operating in a CDA operating mode may operate outside of a normal operating pattern as the valve timing may be altered, such as the intake and/or exhaust valves being closed to deactivate the cylinder(s) during the CDA operating mode.

Referring now to FIG. 1, a schematic diagram of a system 100 is shown, according to an exemplary embodiment. The system 100 may be included in a vehicle such as on-road or an off-road vehicle including, but not limited to, line-haul trucks, mid-range trucks (e.g., pick-up trucks), tanks, airplanes, locomotives, various types of industrial equipment (excavators, backhoes, tractors, mower, etc.) etc. The system 100 may also be part of a stationary system (e.g., generator, certain factory machinery, etc.).

The system 100 includes an engine 102, which includes a plurality of valves 104 operably coupled to a plurality of cylinders 106, a power delivery system 108 coupled to the engine 102, an exhaust gas recirculation ("EGR") system 109, an exhaust aftertreatment system 110 coupled to the engine 102, a filtering system 112 of the exhaust aftertreatment system 110 that includes a hydrocarbon dosing system 116 coupled to a particulate filter 118, sensors 120 (e.g., coupled to the exhaust aftertreatment system 110, the engine 102, and/or other components), an input/output device 124, a valve actuation system 126, and a controller 122 coupled to each of the aforementioned components/systems. It should be understood that the system 100 may include additional, other, or fewer components/systems than those depicted and described herein.

In the example shown, the engine 102 is a compression-ignition engine using fuel configured for compression-ignition engines (e.g., diesel fuel, bio-diesel, etc.). In some other embodiments, the engine 102 is a spark-ignition engine (e.g., engine employing a spark plug to produce ignition) using fuel configured for spark-ignition engines (e.g., gasoline, etc.). In various alternate embodiments, the engine 102 may have other structures or be a part of other engine systems. For example, the engine 102 may be a hybrid engine, which may include both an electric motor or motor(s) and an internal combustion engine that functions to provide power to propel the vehicle. A hybrid vehicle can have various configurations. For example, in a parallel configuration, both the electric motor and the internal combustion engine are operably connected to the power delivery system 108 (examples include extended range electric vehicle or range-extended electric vehicles). In the example depicted, the engine 102 is a compression-ignition powered by diesel fuel.

The engine 102 further includes valves 104. The valves 104 are configured to facilitate an intake of air or a charge into the cylinders 106 and a release or out flow of exhaust gases from the cylinders 106. Each cylinder 106 includes at least two valves 104, an intake valve and an exhaust valve. Opening the intake valve enables the associated cylinder 106 to be in fluid communication with an engine's intake system. The intake valve facilitates the input of constituents, namely charge air or a charge, required for combustion (e.g., air, air and an EGR fraction, etc.). For example, the intake valve allows air and recirculated exhaust gas into the combustion chamber. Opening the exhaust valve enables the associated cylinder 106 to be in fluid communication with the engine exhaust aftertreatment system. The exhaust valve facilitates output of at least a portion of contained cylinder contents. The exhaust valve may exhaust cylinder contents after combustion, or may exhaust cylinder contents prior to combustion or at another time. In some embodiments and in the example shown as described above where engine 102 is a compression-ignition engine, the cylinder 106 includes a fuel injector configured to inject fuel directly into the combustion chamber. As described herein, the controller 122 may selectively open, partially open, and/or close the intake and/or exhaust valves in order to control the amount of oxygen in the exhaust leaving the engine 102. In other embodiments in a PFI/carbureted SI engine, fuel may also be controlled by the intake valve(s).

The system 100 includes a power delivery system 108. The power delivery system 108 is coupled to the engine 102. The power delivery system 108 receives the energy released by the combustion (in the form of a rotating crankshaft) and converts the rotating crankshaft into energy suitable for the function of the system 100. The power delivery system 108 provides power to an end component/system (e.g., power the wheels, another motive device, such as tracks, or a power receiving device if, for example, embodied in a stationary piece of equipment such as a generator or genset). For example, when the system 100 is included in a vehicle, the power delivery system 108 is a drivetrain that may include a transmission, a final drive (e.g., wheels), and any other components of a drivetrain. The power delivery system 108 converts the rotating crankshaft energy into mechanical energy in the form of a rotating driveshaft. The transmission and drivetrain are highly configurable components that may vary based on the application. The power delivery system 108 may include sensors (virtual or real) that provide information or data regarding operation of the power delivery system 108. For example, the sensors 120 may provide the rotational speed of the wheels.

The EGR system 109 is coupled to the engine 102 and the exhaust aftertreatment system 110. The EGR system 109 is configured to direct a portion of the exhaust gas back into at least one of the cylinders of the engine 102, where the exhaust gas is mixed with air from an intake system for combustion. The EGR system 109 operates to reduce combustion temperatures in the at least one cylinder by diluting the amount of oxygen from the intake system. The reduction in combustion temperature reduces the exhaust temperature, which reduces NOx formation from combustion. In various embodiments, the engine 102 includes an EGR bypass valve that can be positioned in an open configuration and a closed configuration (and intermediate positions). In the open configuration, the EGR bypass valve directs at least a portion of the exhaust gas back to the cylinders 106 of the engine 102, as described. In the closed configuration, the EGR bypass valve directs all of the exhaust gas to the aftertreatment system without going back through the cylinders 106.

The system 100 may also include an exhaust aftertreatment system 110. The exhaust aftertreatment system is coupled to the engine 102 and structured to treat exhaust gases from the engine 102 in order to reduce the emissions of harmful or potentially harmful elements (e.g., $NO_X$ emissions, CO emissions, PM emissions, etc.). The aftertreatment system may include various components and system, such as filtering system 112, including a hydrocarbon dosing system 116 coupled to a particulate filter 118, a diesel oxidation catalyst (DOC) 119, and a selective catalytic reduction (SCR) system 117 coupled to an ammonia slip or ammonia oxidation catalyst (ASC) 114.

The particulate filter 118 may be configured to remove particulate matter, such as soot, from exhaust gas flowing in the exhaust aftertreatment system 110. The particulate filter 118 may be a gasoline particulate filter, diesel particulate filter, or another similar filter configured to remove at least a portion of PM from the exhaust gas. During operation, the particulate filter 118 may become saturated with PM, thus reducing the ability of the particulate filter 118 to remove PM from the exhaust gas. The PM saturating the particulate filter 118 can be burned off by bringing the temperature within the particulate filter 118 above a temperature threshold.

In some embodiments, the filtering system 112 may further include a heater and/or a hydrocarbon dosing system 116. The heater may be disposed in the exhaust aftertreatment system 110 (e.g., proximate the particulate filter 118 or another location). The hydrocarbon dosing system may 116 be disposed downstream of the engine and, in particular, within the exhaust aftertreatment system 110. The heater and hydrocarbon dosing system 116 are each configured to increase the temperature of at least one component of the exhaust aftertreatment system 110 and/or of the exhaust gas flowing through the exhaust aftertreatment system 110. The heater and the hydrocarbon dosing system 116 may be activated in tandem with the CDA operating mode to increase the temperature of at least one component of the exhaust aftertreatment system 110 and/or of the exhaust gas flowing through the exhaust aftertreatment system 110. As described herein, various thermal management strategies may be employed with the CDA operating mode during the particulate filter regeneration event to increase the temperature within the particulate filter 118.

One thermal management strategy may include an in-cylinder post-injection event. By injecting fuel into one or more of the cylinders after combustion, the post-injected fuel tends to vaporize rather than combust in the cylinders. The non-combusted post-injected fuel does, however, react with one or more catalysts (e.g., the DOC catalyst) in the aftertreatment system to produce heat (e.g., an exothermic reaction), which raises the temperature of the exhaust gas in the particulate filter 118. Post-injection can be near or far post injection.

Another thermal management strategy may be an external cylinder dosing event (i.e., occurring outside of the cylinder). For example, a hydrocarbon dosing system 116 may be located in the exhaust aftertreatment system 110 (e.g., upstream of the filtering system 112) that is structured to inject an amount of HC fluid (e.g., diesel fuel) into the exhaust gas stream. This injection is also referred to as an external post-cylinder HC fuel injection event. When the fuel is injected into the exhaust stream, the fuel combusts and raises the temperature of the exhaust gas, which later passes through the catalyst and raises the temperature inside the particulate filter 118.

The heater may be any sort of external heat source that is structured or configured to increase the temperature of passing exhaust gas and/or a component of the exhaust aftertreatment system 110. As such, the heater may be an electric heater, an induction heater, a microwave, and/or a fuel-burning (e.g., HC fuel) heater. The heater may be powered from a battery of a vehicle housing the system 100. The heater may be of a convection type, where heat is transferred to flowing exhaust gas, or of a conduction type where the heater heats a component which transfers heat to the flowing exhaust gas. Thus, multiple thermal management strategies/techniques may be employed with the CDA operating mode.

A selective catalytic reduction (SCR) system 117 is configured to convert nitrogen oxides present in the exhaust gases produced by the engine into diatomic nitrogen and water through a reaction with the SCR catalyst. The SCR catalyst operation can be affected by several factors. For example, the effectiveness of the SCR catalyst to reduce the NOx in the exhaust gas can be affected by the operating temperature. If the temperature of the SCR catalyst is below a threshold value or range, the effectiveness of the SCR catalyst in reducing NOx may be reduced below a desired threshold level, thereby increasing the risk of high NOx emissions into the environment. The SCR catalyst temperature can be below the threshold temperature under several conditions, such as, for example, during and immediately after engine startup, during cold environmental conditions, etc. Further, typically, higher combustion temperatures promote engine out NOx (EONOx) production. This is due to the rapid fire expansion from within the cylinder, which leads to the release of NOx. Higher loads and power demands also tend to increase combustion temperatures and, in turn, EONOx. Higher power output coincides with higher fueling pressures and quantity (increases in fuel rail pressure). In turn, increasing fueling pressures, quantity, etc. also tends to promote EONOx production.

The exhaust aftertreatment system 110 may further include a reductant delivery system which may utilize a decomposition chamber (e.g., decomposition reactor, reactor pipe, decomposition tube, reactor tube, etc.) to convert the reductant (e.g., urea, diesel exhaust fluid (DEF), Adblue®, a urea water solution (UWS), an aqueous urea solution, etc.) into ammonia. Reductant is added to the exhaust gas stream to aid in the catalytic reduction. The reductant may be injected by an injector upstream of the SCR catalyst member such that the SCR catalyst member receives a mixture of the reductant and exhaust gas. The reductant droplets undergo the processes of evaporation, thermolysis, and hydrolysis to form non-$NO_x$ emissions (e.g., gaseous ammonia, etc.) within the decomposition chamber, the SCR catalyst member, and/or the exhaust gas conduit system, which leaves the exhaust aftertreatment system 110. The exhaust aftertreatment system 110 may further include an oxidation catalyst (DOC) 119 fluidly coupled to the exhaust gas conduit system to oxidize hydrocarbons and carbon monoxide in the exhaust gas. In order to properly assist in this reduction, the DOC 119 may be required to be at a certain operating temperature. In some embodiments, this certain operating temperature is between approximately 200 degrees C. and 500 degrees C. In other embodiments, the certain operating temperature is the temperature at which the conversion efficiency of the DOC 119 exceeds a predefined threshold value.

In the example shown, the SCR system 117 includes an ASC 114. In other embodiments, the ASC is not disposed as single/unitary piece with the SCR (i.e., coupled to the SCR via a pipe or conduit). In still other embodiments, the ASC 114 is excluded from the aftertreatment system 110. The ASC 114 may also be referred to as an ammonia oxidation catalyst (AMOx). The ASC 114 may be a copper-zeolite ammonia slip catalyst. In operation, unreacted reductant (urea and/or ammonia) may be removed or substantially removed from emission to the environment based on reaction with the ASC 114 that is structured to remove unreacted reductant from the exhaust gas stream.

The exhaust aftertreatment system 110 may further include a Lean NOx Trap (LNT) and/or a three-way catalyst (TWC) (or another catalytic converter). The LNT may act to reduce NOx emissions from a lean burn internal combustion engine by means of adsorption. Among other potential functions and features, the TWC may function to manage emissions from rich-burn engines while providing optimal performance with minimal cleaning or maintenance. Utilizing a flow-through substrate coated with a precious metal catalyst, the chemical oxidation process may convert engine out emissions into harmless nitrogen, carbon dioxide and water vapor as the gas passes through the catalytic converter (e.g., three-way catalyst).

The exhaust aftertreatment system 110 may include sensors (virtual or real) that provide information or data regarding operation of the exhaust aftertreatment system 110. The sensors 120 may monitor the characteristics (e.g., contents, temperature, pressure, etc.) of the exhaust gas into, within, and/or out of the exhaust aftertreatment system 110. The sensors 120 may also monitor characteristics of various components (e.g., catalytic converter, DOC 119, etc.) of the exhaust aftertreatment system 110. For example, the exhaust aftertreatment system 110 may include one or more pressure sensors configured to detect a pressure differential across the particulate filter 118.

It should be understood that in other embodiments, more, less, or different components/systems/or devices may be included the exhaust aftertreatment system 110. For example, in other embodiments, multiple SCR systems may be included, multiple heaters may be included, an ammonia slip catalyst positioned downstream of the SCR, multiple dosing systems, and so on. Thus, this depiction is meant to be exemplary only with the other configurations intended to fall within the scope of the present disclosure. Further, the spatial arrangement of the components may differ than what is depicted.

As described herein, the controller 122 may be coupled to and monitor operation of the system 100 via one or more sensors 120. The sensors 120 are structured to detect operational characteristics (e.g., temperature, pressure, exhaust gas contents, etc.) of certain components of FIG. 1, such as the engine 102, the cylinders 106, the power delivery system 108, the exhaust aftertreatment system 110, and so on. The number, placement, and type of sensors included in the system 100 is highly configurable. The sensors 120 may include, but are not limited to, one or more of a pressure sensor, temperature sensor (e.g., fluid temperature sensor, solid surface temperature sensors, IR sensor, etc.), a fluid sensor (e.g., exhaust gas flow rate, coolant flow rate, etc.), torque sensor, speed sensor (e.g., to determine at least one of an engine speed or a vehicle speed), and so on.

Certain sensors 120 may be located proximate to the cylinder 106. In some embodiments, the sensors 120 may be included in the exhaust channels, conduits, pipes, etc. leading away from the cylinder 106. Accordingly, one or more sensors 120 may be structured to detect or otherwise acquire information regarding the exhaust gas emitted from the engine (e.g., exhaust gas constituent information, exhaust gas flow rate, exhaust gas temperature at various locations, and so on). For example, an oxygen sensor may be disposed in the exhaust channel leading away from the cylinders 106 and may detect the concentration of oxygen in the exhaust flow. As another example, a mass flow sensor may be disposed in the exhaust channels leading away from the cylinders 106 and structured to determine a flow rate of exhaust gas away from the cylinders 106. As another example, the sensors 120 may include a temperature sensor structured to determine the temperature of the exhaust flow exiting the cylinders 106. A pressure sensor may be disposed proximate to a fueling system for the engine and structured to acquire information regarding a fuel pressure (or, with systems with a common rail, a pressure of the common rail). In some embodiments, one or more sensors may be positioned within the cylinders 106 or within the intake channel of the cylinder 106. In some embodiments, the cylinder 106 may include a plurality of sensors 120 each structured to detect different characteristics (e.g., fluid information regarding flow entering, leaving, and/or inside the cylinders 106). In some embodiments, each individual sensor 120 is structured to detect multiple types of flow characteristics.

As indicated above, the sensors 120 may be further located within or proximate to the exhaust aftertreatment system 110. In some embodiments, the sensors 120 may be located within or proximate to components of the exhaust aftertreatment system 110, such as the particulate filter 118. In some embodiments, the sensors 120 are located directly in fluid conduits (e.g., pipes, etc.) between the components of the exhaust aftertreatment system 110. The one or more sensors 120 may be structured to detect or otherwise acquire information regarding the components of the exhaust aftertreatment system 110 and/or the exhaust gases flowing through the exhaust aftertreatment system 110. For example, a plurality of pressure sensors may determine the pressure of the exhaust gas before and after the particulate filter 118. As another example, a mass flow sensor may be disposed upstream of the filtering system 112 and structured to determine a flow rate of exhaust gas entering the particulate filter 118. Based on the flow rate over a predefined unit of time, the controller 122 may determine an amount of exhaust gases entering the particulate filter 118 for a period of time (via an integration process using the flow rate over a predefined amount of time). In some embodiments, one or more sensors 120 may be located outside of, but proximate to, the exhaust aftertreatment system 110. For example, a temperature sensor may detect the ambient temperature nearby, but not within, the exhaust aftertreatment system 110.

The sensors 120 may also include sensors to detect information regarding the effectiveness of the exhaust aftertreatment system 110 and, particularly, components thereof. The sensors may be NOx sensors, particulate matter (PM) sensors, and/or other emissions-related sensors. The sensors 120 may be located before, after, and/or between the individual components of the exhaust aftertreatment system 110. The sensors 120 are structured to acquire data indicative of emissions at each location that the sensors 120 are located (e.g., concentration amounts, such as parts per million). Effectiveness of the exhaust aftertreatment system 110 may be based on a $NO_X$ conversion efficiency (e.g., fraction of $NO_X$ converted to Nitrogen and water), a measure or estimate of PM emissions relative to a threshold, a measure or estimate of greenhouse gas emissions (e.g., carbon dioxide, methane, nitrous oxide, etc.) relative to a threshold, a combination thereof, and so on (e.g., an ammonia slip amount relative to a threshold, etc.).

Additional sensors 120 may be also included with the system 100. The sensors 120 may include engine-related sensors (e.g., torque sensors, speed sensors, pressure sensors, etc.). The sensors 120 may further include sensors 120 associated with other components of the vehicle (e.g., speed sensor of a turbo charger, fuel quantity and injection rate sensor, etc.).

The exhaust gas and exhaust aftertreatment system 110 characteristics may be determined by the controller 122 after receiving signals, information, data, etc. from the at least one sensor 120. The controller 122 may use the information from the sensor 120 to assess particulate filter 118 operation. For example, based on temperature data regarding the particulate filter 118 being at or above a predefined threshold, the controller 122 may determine whether particulate filter regeneration is present in the particulate filter 118 of the exhaust aftertreatment system 110. This is a passive regeneration event as the filter regeneration was not explicitly commanded.

An input/output device 124 is also included in the system 100. The input/output device 124 is coupled to the controller 122, and in turn, may exchange signals, information, etc. with the controller 122. For example, the input/output device 124 may provide an indication regarding a change in power requested from the system 100. The input/output device 124 may include a vehicle control device, such as an accelerator pedal, a transmission shifter, a brake pedal, transmission paddle shifter, etc. The input/output device 124 may include a steering wheel, a joystick, a brake pedal, an accelerator pedal, etc. For example, when the accelerator pedal is pressed, the controller 122 may interpret this position as a request for an increase in power. The controller 122 may use the information received from the input/output device 124 to determine or adjust the operation conditions of the system 100. The input/output device 124 may further include a display device (e.g., LCD display, LED display, screen etc.), a visual indicator (e.g., indicator light, switch, etc.), an audio indicators (e.g., speaker, etc.), and/or the like. For example, the input/output device 124 may include an LED light that flashes to indicate that the engine is operating in a CDA mode. Thus, the input/output device may be one or more display devices included with the vehicle that houses the system 100. It should be understood that while the term "input/output" is used, the devices may be input-only devices, output-only devices, and/or a device that is configured to receive an input and provide an output (i.e., an input and output device).

A valve actuation system 126 is included in the system 100. The valve actuation system 126 is coupled to the controller and to a camshaft of the engine 102. The valve actuation system 126 is configured to rotate the camshaft responsive to signals, commands, etc. from the controller 122. The valve actuation system 126 may be coupled directly to valves of the engine 102, such that the valves may be operated (at least partly opened or closed) without the camshaft. In some embodiments, the valve actuation system 126, based on one or more commands or instructions from the controller 122, may operate the intake valves and/or exhaust valves of at least one cylinder 106 outside of a typical operating pattern (e.g., the intake valve is open during the exhaust stroke of the cylinder 106).

Also as shown, the system 100 includes the controller 122. The controller 122 is structured to control, at least partly, operation of the engine 102 (including the valves 104 and the cylinders 106), EGR system 109, the exhaust aftertreatment system 110 (including the hydrocarbon dosing system 116), valve actuation system 126, the sensors 120, the input/output device 124, and/or other components of the system 100. Communication between and among the components may be via any number of wired and/or wireless connections. For example, a wired connection may include a serial cable, a fiber optic cable, a CAT5/5e/6/7 cable, or any other form of wired connection. A wireless connection may include the Internet, Wi-Fi, cellular, radio, etc. In one embodiment, a controller area network ("CAN") bus provides the exchange of signals, information, and/or data. The CAN bus includes any number of wired and wireless connections that provide the exchange of signals, information, and/or data.

Figure 2:
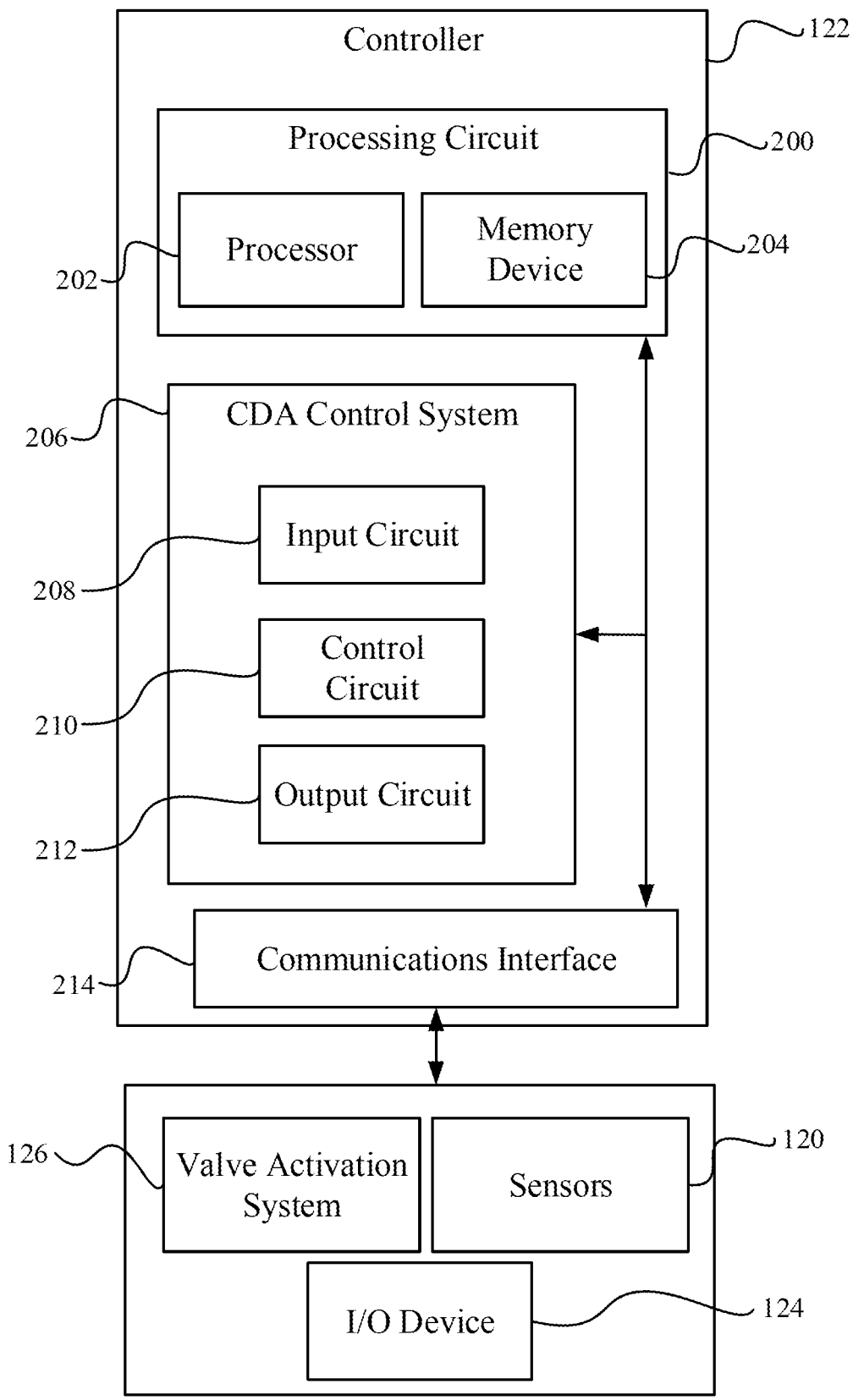
FIG. 2 is a schematic diagram of the controller of FIG. 1, according to an exemplary embodiment.

Referring now to FIG. 2, a schematic diagram of the controller 122 of FIG. 1 is shown, according to an exemplary embodiment. The controller 122 is structured to receive inputs (e.g., signals, information, etc.) from one or more components of the system 100, such as the sensors 120 and the input/output device 124. As the components of FIG. 2 can be embodied in a vehicle, the controller 122 may be structured as one or more electronic control units (ECUs). The controller 122 may be separate from or included with at least one of the transmission control unit, an exhaust aftertreatment control unit, a powertrain control module, an engine control module, etc.

In operation, the controller 122 is configured to determine whether a particulate filter regeneration event is desired, needed, or may be needed to restore the effectiveness of the particulate filter 118. In some embodiments, the controller 122 may receive an indication to activate a particulate filter regeneration event and may implement the regeneration event without determining whether the regeneration event is desired (e.g., an explicit user input commanding a regeneration event via a display device of the vehicle). Responsive to determining that a particulate filter regeneration event is triggered, the controller 122 is configured to determine an engine operating mode for the engine 102 and command the valve actuation system 126 to operate the engine 102 in the engine operating mode. The engine operating mode may include the engine 102 operating in a CDA mode. Operating the engine 102 in a CDA mode increases the temperature of the exhaust gas exiting the engine 102 and entering the exhaust aftertreatment system 110. Increasing the exhaust gas temperature raises the temperature of the components, such as the particulate filter 118, of the exhaust aftertreatment system 110, to at or above a temperature threshold for particulate filter regeneration. The controller 122 may also receive and analyze data from the sensors 120 to determine the temperature and oxygen level (e.g., in the exhaust gas at various locations, such as upstream of the particulate filter 118) to determine whether thermal runaway may occur based on comparing the sensor 120 data values to one or more predefined thresholds, or in some embodiments, a predefined range of data values. In response to the comparison, the controller 122 may command the valve actuation system 126 to adjust (e.g., decrease or increase) the oxygen level in the exhaust flow to maintain a desired amount of oxygen (e.g., oxygen required for PM burn oft) in the exhaust flow but maintain the oxygen amount below a threshold for thermal runaway (e.g., retain the oxygen amount above a lower oxygen threshold in order to promote increased temperatures and below an upper oxygen threshold to prevent thermal runaway and potential damage to the exhaust aftertreatment system 110).

The controller 122 is shown to include a processing circuit 200 having a processor 202 and a memory device 204, a CDA control system 206 having an input circuit 208, a control circuit 210, and an output circuit 212, and a communications interface 214.

The communications interface is structured to enable the controller 122 to communicate with the system 100 components such as the valve actuation system 126, the sensors 120, and the input/output device 124. The communications interface 214 may include any combination of wired and/or wireless interfaces (e.g., jacks, antennas, transmitters, receivers, transceivers, wire terminals, etc.) for conducting data communications with these various systems, devices, or networks to enable in-vehicle communications (e.g., between and among the components of the system) and, in some embodiments, out-of-vehicle communications (e.g., with a remote server). For example and regarding out-of-vehicle/system communications, the communications interface 214 may include an Ethernet card and port for sending and receiving data via an Ethernet-based communications network and/or a Wi-Fi transceiver for communicating via a wireless communications network. In some embodiments, a telematics device may be included with the vehicle that enables out-of-vehicle communications. The communications interface 214 may be structured to communicate via local area networks or wide area networks (e.g., the Internet) and may use a variety of communications protocols (e.g., IP, LON, Bluetooth, ZigBee, radio, cellular, near field communication, etc.).

In one configuration, the input circuit 208, the control circuit 210, and the output circuit 212 are embodied as machine or computer-readable media storing instructions that are executable by a processor, such as processor 202 and stored in a memory device, such as memory device 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming language, such as the "C" programming language or similar programming languages.

In another configuration, the input circuit 208, the control circuit 210, and the output circuit 212 are embodied as hardware units, such as electronic control units. As such, the input circuit 208, the control circuit 210, and the output circuit 212 may be embodied as one or more circuitry components including, but not limited to, processing circuitry, network interfaces, peripheral devices, input/output devices, output device, sensors, etc. In some embodiments, the input circuit 208, the control circuit 210, and the output circuit 212 may take the form of one or more analog circuit, electronic circuit (e.g., integrated circuits (IC), discrete circuits, system on a chip (SOCs) circuits, microcontrollers, etc.), telecommunication circuits, hybrid circuits, and any other type of "circuit." In this regard, the input circuit 208, the control circuit 210, and the output circuit 212 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on. The input circuit 208, the control circuit 210, and the output circuit 212 may also include programmable hardware devices such as field programmable gate arrays, programmable array logic, programmable logic devices or the like. The input circuit 208, the control circuit 210, and the output circuit 212 may include one or more memory device for storing instructions that are executable by the processor(s) of the input circuit 208, the control circuit 210, and the output circuit 212. The one or more memory device and processor(s) may have the same definition as provided below with respect to memory device 204 and processor 202. In some hardware unit configurations, the input circuit 208, the control circuit 210, and the output circuit 212 may be geographically dispersed throughout separate locations in, for example, a vehicle. Alternatively and as shown, the input circuit 208, the control circuit 210, and the output circuit 212 may be embodied in or within a single unit/housing, which is shown as the controller 122.

In the example shown, the controller 122 includes the processing circuit 200 having the processor 202 and the memory device 204. The processing circuit 200 may be structured or configured to execute or implement the instructions, commands, and/or control processes described herein with respect to the input circuit 208, the control circuit 210, and the output circuit 212. The depicted configuration represents the input circuit 208, the control circuit 210, and the output circuit 212 as machine or computer-readable media storing instructions where each of the circuits may be included within the memory device 204. However, as mentioned above, this illustration is not meant to be limiting as the present disclosure contemplates other embodiments where the input circuit 208, the control circuit 210, and the output circuit 212, or at least one circuit of the input circuit 208, the control circuit 210, and the output circuit 212, is configured as a hardware unit. All such combinations and variations are intended to fall within the scope of the present disclosure.

The processor 202 may be a single- or multi-chip processor, a digital signal processor (DSP), an application specific integrated circuit (ASIC), a field programmable gate array (FPGA) or other programmable logic device, discrete gate or transistor logic, discrete hardware components, or any combination thereof, and the like. In this regard, a processor may be a microprocessor, or, any conventional processor or state machine. A processor also may be implemented as a combination of computer devices, such as a combination of a DSP and a microprocessor, a plurality of microprocessors, one or more microprocessors in conjunction with a DSP core, or any other such configuration. In some embodiments, the processor 202 may be shared by multiple circuits (e.g., the input circuit 208, the control circuit 210, and the output circuit 212 may comprise or otherwise share the same processor that, in some example embodiments, may execute instructions stored, or otherwise accessed, via different areas of memory). Alternatively or additionally, the one or more processors may be structure to perform or otherwise execute certain operations independent of one or more coprocessors. In other example embodiments, two or more processors may be coupled via a bus to enable independent, parallel, pipelined, or multi-threaded instruction execution. All such variations are intended to fall within the scope of the present disclosure.

The memory device 204 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 204 may be coupled to the processor 202 to provide computer code or instructions to the processor 202 for executing at least some of the processes described herein. Moreover, the memory device 204 may be or include tangible, non-transient volatile memory or non-volatile memory that stores instructions for execution by the processor 202. Accordingly, the memory device 204 may include database components, object code components, script components, or any other type of information structure for supporting the various activities and information structures described herein.

The CDA control system 206 is structured to receive information from the sensors 120 regarding system 100 operation through the input circuit 208. In particular, the input circuit 208 is structured to receive information from the sensors 120 via the communications interface 214. The input circuit 208 may also receive data (e.g., power request commands) from the input/output device 124 (e.g., depression of the accelerator pedal, release of the accelerator pedal, indications of transmission shift events, explicit operator commands such as a command for a regeneration event, etc.). The input circuit 208 may modify or format the received information (e.g., via an analog/digital converter, etc.) so that the information can be readily used by the control circuit 210 or another circuit (e.g., the output circuit 212).

Based on the received information, the control circuit 210 of the CDA control system 206 is structured to monitor the system 100 and determine one or more control operating parameters for the valve actuation system 126, engine 102, and/or various other components or systems. The output circuit is structured to send the control operating parameters to the valve actuation system 126 and/or other components of the system 100. The output circuit 212 may modify or format the information prior to sending (e.g., via an analog/digital converter, etc.) so that information can be readily used by the valve actuation system 126 and/or other systems, components, etc.

The CDA control system 206 is structured to implement a CDA operating mode with the engine 102. The CDA control system 206 is configured to control selective activation and deactivation of one or more of the cylinders 106 of the engine 102. The CDA control system 206 is also structured to implement various CDA operating modes, such as a dynamic skip-fire operating mode, a fixed cylinder operating mode, etc. As an example, the CDA control system 206 may command the valve actuation system 126 to control one or more valves associated with one or more cylinders (e.g., an intake valve) to prevent intake air or a charge from being inhaled by those one or more cylinders thereby deactivating those one or more cylinders. Additionally or alternatively, the CDA control system 206 may command a fueling system to prevent fuel from being injected (e.g., via a command to one or more fuel injectors) into the one or more cylinders chosen for deactivation (i.e., deactivate a fuel injector for one or more deactivated cylinders).

The CDA control system 206 may also determine the power provided by the active cylinders 106 to the power delivery system 108 during the CDA operating mode. For example, a sensor 120 (e.g., an engine torque sensor, an engine speed sensor, etc.) may monitor the power output (e.g., based on engine torque and speed characteristics, etc.) and send the power output data to the controller 122. The sensor 120 may monitor characteristics of the engine (and/or other components of the system) and send that information to the controller 122 to determine an approximate power output. As another example, the CDA control system 206 may correlate fueling commands (e.g., quantity, timing, etc.) to an approximate power output (or, in some embodiments, a torque demand) demanded for the engine (i.e., the active cylinders) (e.g., via one or more look-up tables or models that correlate fueling to power output or torque demand).

The CDA control system 206 is structured to receive system characteristics (e.g., temperature, flow rate, etc.) regarding operation of the system 100. The system characteristics may include a temperature regarding (e.g., of or within) the particulate filter 118, a temperature of the exhaust gas at various locations, or another temperature measurement that indicates whether regeneration may occur. The system characteristics may further include data pertaining to air-to-fuel ratio. The system characteristics may further include EGR data, flow rate, pressure, etc.

The CDA control system 206 is structured or configured to determine whether a particulate filter regeneration event trigger is present based on the received system characteristics. The trigger corresponds to a state of either the system 100 or, more specifically, the particulate filter 118 for activating the particulate filter regeneration event. In some embodiments, the predetermined trigger may correspond to the controller 122 determining that the run-time of the system 100 has exceeded a predetermined threshold since a last regeneration event, where the run-time may correspond to miles-traveled, engine operating time (e.g., in hours, etc.), or a similar parameter. In some embodiments, the predetermined trigger may correspond to the system 100 exceeding a cumulative operating time with an exhaust gas or catalyst temperature below a pre-determined threshold, where cumulative refers to the aggregation of multiple on/off system times. In some embodiments, the predetermined trigger may correspond to the system 100 exceeding a cumulative amount of fuel burned since a last particulate filter regeneration event. In some embodiments, the predetermined trigger may correspond to the controller 122 determining that the effectiveness of the particulate filter 118 does not meet or satisfy an effectiveness threshold. The effectiveness threshold may be a predefined pressure differential across the particulate filter 118, such that when the pressure differential (determined or measured) across the particulate filter exceeds the predefined pressure differential, the controller determines that the particulate filter 118 needs to be regenerated (i.e., a triggering event). In some embodiments, the predetermined trigger may correspond to the controller 122 determining that a measure of PM in the exhaust gas after the particulate filter is above a threshold amount or rate of acceptable PM downstream of the filter, which indicates that the particulate filter 118 may be saturated with PM and is not filtering out PM at an acceptable/desirable rate. In some embodiments, the predetermined trigger may correspond to an input from the input/output device 124, such as an operator of the system 100 pressing a button, or something similar. In some embodiments, the predetermined trigger may correspond to the controller 122 determining that a desorb event involving the DOC occurred or is occurring, which may introduce additional PM into the particulate filter 118, thus accelerating the need for a regeneration event.

If the CDA control system 206 determines that a particulate filter regeneration event trigger is present, the CDA control system 206 determines a CDA operating mode for the engine 102 to enable, at least partly, regeneration of the particulate filter 118. For example, the CDA control system 206 may activate a CDA operating mode upon receiving or determining the trigger. If the temperature regarding the particulate filter 118 is below a temperature threshold (i.e., a predefined regeneration temperature threshold for burning off PM, which may be determined by a DPF temperature sensor), the CDA control system 206 may determine to deactivate additional cylinders relative to the initially implemented CDA operating mode (e.g., going from a firing fraction of ⅝ active cylinders to ⅜ active cylinders, as an example). Decreasing the number of active cylinders while maintaining the power output increases the temperature of the exhaust gas, which can be utilized during particulate filter regeneration. In some embodiments, the temperature threshold may be changed based on a state of the particulate filter 118. For example, if the predetermined trigger is a pressure differential across the particulate filter 118, a high pressure differential may correspond with a higher predefined threshold temperature than a lower pressure differential, as the high pressure differential may indicate that more PM needs to be burned off in order to obtain a predefined acceptable pressure differential across the particulate filter 118. As such, relatively more cylinders may be deactivated during the CDA operating mode for high pressure differentials that exceed the predetermined threshold for a trigger event compared to pressure differentials that only slightly exceed the predetermined threshold for the trigger event. In some embodiments, the CDA control system 206 may determine an available (e.g., able to be produced) power output (or torque output; i.e., an engine output torque) of the CDA operating mode. For example, the CDA control system 206 may determine an available power output for various firing fractions. The CDA control system 206 may compare the available power output to a requested power output (or torque output that may be determined based on the requested fueling amount). If the CDA control system 206 determines that the available power output is below the requested power output, the CDA control system 206 does not enable a CDA operating mode because the CDA operating may not be able to meet the requested torque demand.

The CDA control system 206 may also determine an oxygen content, and particularly an air-to-fuel ratio (AFR), for meeting power demands and avoiding an oxygen amount above a predefined threshold (i.e., an upper oxygen threshold) during the CDA operating mode. The CDA control system 206 may monitor the oxygen content in the exhaust gas (e.g., upstream of, proximate to, within the particulate filter 118, etc.) during a CDA operating mode via an oxygen sensor or other methodology to determine an approximate oxygen content. When the oxygen content is above the upper oxygen threshold, the controller may command the valve actuation system 126 to deactivate additional cylinders, thus reducing the oxygen content in the exhaust. However, the CDA control system 206 may also determine a minimal firing fraction that can produce the power required by the engine. The minimal firing fraction is the lower limit regarding how many cylinders can be deactivated during the CDA operating mode, which may be dependent on the CDA mode initiated (e.g., fixed cylinder, DSF, etc.). For example, the CDA control system 206 may determine that a first power level requires three of six total cylinders 106 to be active, while a second power level requires four of six total cylinders 106 to be active, wherein the second power level is greater than the first power level. In some embodiments, the CDA control system 206 determines the firing fraction (in this case, active cylinders) based on a look-up table that includes calibrated data (e.g., calibration table). In some embodiments, the CDA control system 206 determines the firing fraction by utilizing a physics model based circuit running in real-time. In some embodiments, the CDA control system 206 determines the firing fraction experimentally by deactivating cylinders until a desired temperature is reached that also maintains the desired power output (or torque output).

In some embodiments, the CDA control system 206 may command the valve actuation system 126 to operate in a minimal firing fraction when the CDA operating mode is active. In some embodiments, the CDA operating mode continues for a predetermined amount of time (e.g., 1 s, 2 s, 3 s, 4 s, 5 s, 10 s, 15 s, 30 s, 60 s, 90 s, 120 s, etc.). For example, the CDA control system 206 may command the valve actuation system 126 to operate in the CDA operating mode for 60 seconds. Then after 60 seconds, the valve actuation system 126 may stop the CDA operating mode. In some embodiments, the CDA operating mode may operate until conditions that resulted in the particulate filter regeneration event are alleviated. For example, the CDA operating mode continues until the pressure differential across the particulate filter 118 is below the pressure differential threshold. As another example, the CDA operating mode may continue until a measure of the PM making it through the particulate filter 118 is below a predetermined threshold.

In some embodiments, the CDA control system 206 sends signals to the valve actuation system 126 to operate valves 104 in a typical operating pattern while cycling the cylinders 106. During this time, the CDA control system 206 receives information regarding exhaust gas and particulate filter 118 content (e.g., an oxygen value, etc. wherein the values are at an instant in time or over a predefined amount of time) and receives information regarding the temperature of the particulate filter 118. In some embodiments, the output circuit 212 cycles the cylinders 106 a predefined number (e.g., 1, 2, 3, 4, 5, 6, etc.) of times. Further, at least one of the intake or exhaust valves may be open during the cycling so that the contents of the at least one deactivated cylinder are modified until a desired content composition is obtained (e.g., based on information from one or more sensors upstream and/or downstream of the cylinder, such as an oxygen content value, an EGR value, etc.). Opening the valves 104 of deactivated cylinder 106 allows for intake air (and thus oxygen) to travel through the cylinder 106 without combustion, thus providing the particulate filter 118 additional oxygen for burn off. The CDA control system 206 may open the valves 104 upon determining that the oxygen content in the particulate filter 118 is below a lower oxygen threshold needed for burn off. For example, the CDA control system 206 may determine that a firing fraction of ⅗ (active cylinders) is desirable for operation. However, to keep oxygen content above the lower oxygen threshold, the CDA control system may determine that the valves 104 of two of the deactivated cylinders 106 should be held open during the CDA operating mode. Once the CDA operating mode ends, the controller 122 may command the valve actuation system 126 to operate the valve 104 in a standard operation.

Figure 3:
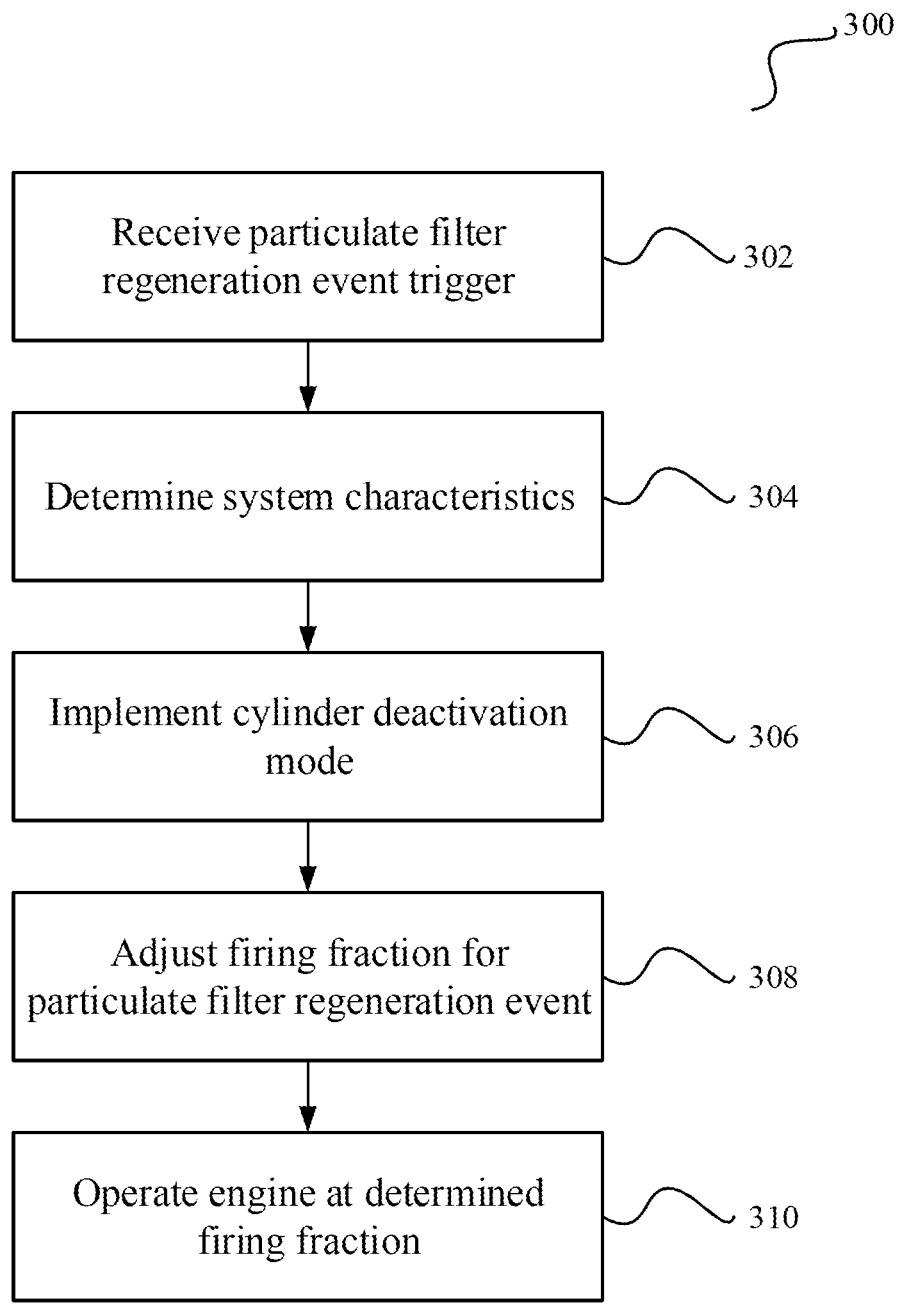
FIG. 3 is a flow diagram of determining a firing fraction for a CDA operating mode of an engine in response to identifying and/or determining a particulate filter regeneration event trigger, according to an exemplary embodiment.

Referring now to FIG. 3, a flow diagram of a method 300 of determining a firing fraction of an engine based on detecting, determining, and/or otherwise identifying a particulate filter regeneration event trigger is shown, according to an exemplary embodiment. The controller 122 is structured to command the valve actuation system 126 to selectively deactivate and active cylinder(s) 104 after determining an operating condition of the engine 102 that may allow for a particulate filter regeneration event.

At process 302, the controller 122 receives or determines a particulate filter regeneration event trigger. The particulate filter regeneration event trigger may be or be based on a signal received from at least one sensor 120 located proximate to the particulate filter 118, the exhaust aftertreatment system 110, or another component of the system 100. The particulate filter regeneration event trigger is an indication regarding a condition indicative of a need or a potential need for regeneration of the particulate filter 118. In some embodiments, the controller 122 may be configured to receive a variety of particulate filter regeneration event triggers, or may be configured to receive just one particulate filter regeneration event trigger. In some embodiments, the particulate filter regeneration event trigger may be determined by the controller 122. For example, the controller 122 may determine that the run-time of system 100 has exceeded a run-time threshold, thus activating the particulate filter regeneration event trigger. As another example, the controller 122 may determine that the pressure differential across the particulate filter 118 is above a threshold, thus activating the particulate filter regeneration event trigger. As another example, the controller 122 may determine that a measure of PM after the particulate filter 118 is above a predetermined threshold, thus activating the particulate filter regeneration event trigger.

At process 304, the controller 122 determines system characteristics. The controller 122 may determine a desired power output for the system 100 and then determine a minimum firing fraction that ensures or attempts to ensure that the system 100 may produce the desired power output (or, in some embodiments, torque demand). The controller 122 may also determine characteristics (e.g., temperatures, flow rates, etc.) of the components of the system 100, and, more specifically, the exhaust aftertreatment system 110. For example, the controller 122 may determine, based on data received from the sensors 120, the exhaust gas temperature at various locations, the temperature of the particulate filter, etc. In some embodiments, the controller 122 may determine the system characteristics based on the information associated with the particulate filter regeneration event trigger (e.g., a pressure differential measured or determined across the particulate filter 118). For example, if the pressure differential is significantly higher than a predefined acceptable threshold (i.e., an upper threshold), the controller 122 may determine that a higher temperature is desired for burning off the PM in the particulate filter, than when the pressure differential is above, but closer to, the upper threshold.

At process 306, the controller 122 commands the valve actuation system 126 to operate the engine 102 in a CDA operating mode based on the received or determined particulate filter regeneration event trigger and/or the system characteristics. The controller 122 may determine a predetermined CDA operating mode corresponding to a predetermined particulate filter regeneration event trigger (e.g., based on a look-up table, a model, etc.). For example, after the controller 122 receives a particulate filter regeneration event trigger, the controller 122 may utilize a look-up table to determine a corresponding CDA operating mode. In some embodiments, the CDA operating mode may be based on the controller 122 using an algorithm utilizing the system characteristics and/or the particulate filter event trigger. In some embodiment, the controller 122 utilizes a separate map (e.g., schematic, schema, etc.) for the CDA operating mode corresponding to the particulate filter regeneration event than for a CDA operating mode outside of a particulate filter regeneration event. For example, the CDA control system 206 may store a map that correlates firing fractions to exhaust gas temperatures for particulate filter regeneration. The map may also include trigger events. As an example, a pressure differential may exceed an upper pressure differential. The map may store a temperature associated with burning off PM in a certain amount of time when the pressure differential exceeds this upper threshold. The controller 122 may then command the firing fraction associated with this temperature. In comparison, CDA may be commanded during normal operation. In which case, the controller 122 may command a second or base map for this operation that defines firing fractions, modes (e.g., DSF, fixed cylinder, etc.), based on various operating conditions. Thus, a specialized particulate filter regeneration map may be utilized by the controller 122 during particulate filter regeneration. In some embodiments, the controller 122 may adjust post-fuel injection by the hydrocarbon dosing system 116 during the CDA operating mode to achieve or attempt to achieve the desired temperature. As an example, the controller 122 may correlate firing fraction to exhaust gas temperature to post-injection values (e.g., amount and frequency) to determine when to command HC post-injection to achieve or attempt to achieve desired temperatures (which may be based on experimental data). In some embodiments, the controller 122 may minimize EGR from the EGR system 109 to achieve the desired temperature or exhaust gas content.

At process 308, the controller 122 adjusts the firing fraction for the engine for the particulate filter regeneration event. Adjusting the firing fraction may be in response to the controller 122 determining that the temperature is too low for particulate filter regeneration to occur (i.e., a temperature regarding the filter is at or below a predefined regeneration temperature threshold). The firing fraction may be determined as the firing fraction for the CDA operating that will or likely will produce an exhaust gas temperature for the particulate filter regeneration event. The controller 122 may determine the firing fraction based on an algorithm, look-up table, and/or the like. For example, the look-up table may indicate a first temperature corresponds to a firing fraction of $4/6$, a second temperature corresponds to a firing fraction of $3/6$, and a third temperature corresponds to a firing fraction of $2/6$, the first temperature being lower than the second temperature, which is lower than the third temperature. In some embodiments, system dynamics may limit the firing fractions available for use. For example, certain engines 102 may only deactivate cylinders 106 in pairs and thus only even numbered firing fractions are available (e.g., $2/6$, $4/6$, $2/8$, $4/8$, $6/8$, etc.). In some embodiments, the controller 122 may also determine whether fuel injection via the hydrocarbon dosing system 116 is desired to aid the CDA operating mode. At process 310, the controller 122 commands the valve actuation system 126 to operate the engine 102 in the CDA operating mode with the determined firing fraction. While the engine 102 operates in the CDA mode, the controller 122 continuously monitors the characteristics (e.g., temperature, oxygen content, etc.) of the particulate filter 118 (and/or other components or exhaust gas temperatures) and may further adjust the firing fraction to maintain temperature at or above a regeneration temperature threshold for regeneration.

Figure 4:
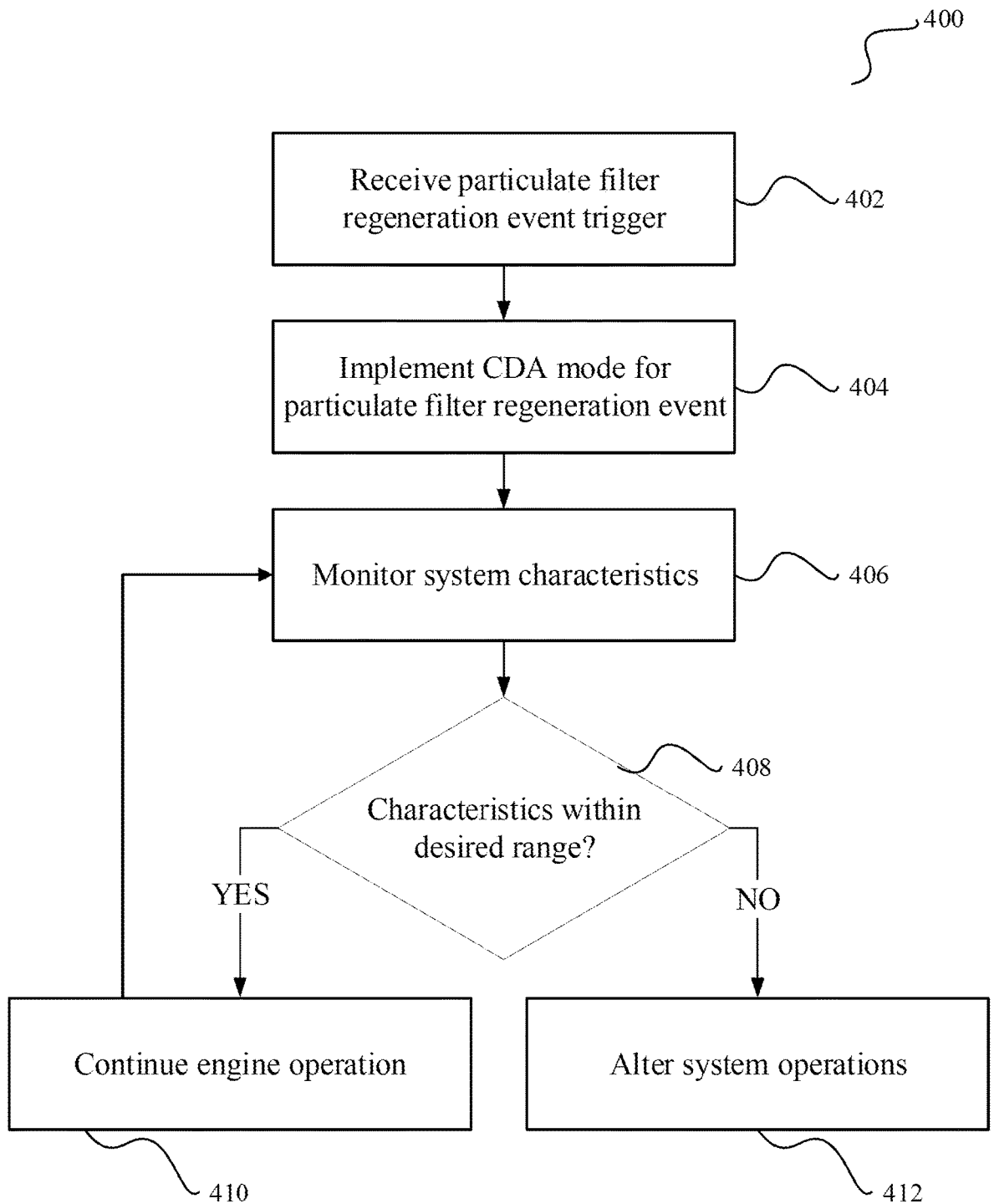
FIG. 4 is a flow diagram of operating a valve actuation system to control system operations and, in particular, a CDA operating mode, according to an exemplary embodiment.

Referring now to FIG. 4, a flow diagram of a method 400 of operating a valve actuation system to implement a CDA operating mode for and/or during a particulate filter regeneration event while mitigating against thermal runaway is shown, according to an exemplary embodiment. In method 400, the controller 122 monitors the particulate filter 118 during a CDA operating mode and reacts to various characteristics to prevent or mitigate against thermal runaway.

At process 402, the controller 122 receives or determines a particulate filter regeneration event trigger as described above with reference to process 302 of FIG. 3. At process 404, the controller 122 commands the valve actuation system 126 to operate the engine 102 in a CDA operating mode desired for the particulate filter regeneration event, as described in reference to FIG. 3. The CDA mode may be DSF, fixed cylinder, or another CDA operating mode. Further, the firing fraction for the CDA mode may be adjusted in order to meet or attempt to meet regeneration temperatures for the particulate filter. During the CDA operating mode, the valve actuation system 126 may deactivate one or more cylinders by ceasing fuel injection in one or more cylinders, closing one or more intake and/or exhaust valves for a cylinder(s), and/or any combination thereof for deactivating one or more cylinders.

At process 406, the controller 122 monitors the system characteristics. In particular, the controller 122 may monitor operating characteristics of the particulate filter 118 during the regeneration event. As an example, the controller 122 monitors the temperature of the particulate filter 118, the soot and/or oxygen content of the exhaust gas in the aftertreatment system 110, and, particularly, the soot and/or oxygen content entering or in the particulate filter 118 (e.g., based on data received from the sensors 120). The controller 122 monitors the characteristics continuously or periodically (e.g., each second, each 2 seconds, each minute, etc.) to determine whether thermal runaway is occurring, or whether there is a risk of thermal runaway. Thermal runaway may occur during a particulate filter regeneration event when there is soot and oxygen above threshold amounts, and the temperature gets higher intended and starts feeding itself. This may result in irreversible damage to the particulate filter (e.g., DPF) itself. As described herein, the controller 122 controls and prevents or attempts to prevent this undesired occurrence by using firing fractions to minimize oxygen flow to the DPF yet keeping sufficient oxygen to achieve or attempt to achieve desired regeneration temperatures. The controller 122 also monitors the characteristics to ensure or attempt to ensure the temperature and oxygen content are sufficient (e.g., temperature is below an upper temperature threshold and oxygen content is between the lower oxygen threshold and upper oxygen threshold) for burn off of the PM on the particulate filter 118. The controller 122 may determine a minimum AFR needed for burn off. The minimum AFR is determined as the minimum AFR that yields excess exhaust oxygen (e.g., minimum AFR greater than the stoichiometric AFR for the fuel). The controller 122 may also determine a minimum firing fraction that ensures or attempts to ensure that the system 100 may produce the desired power output (or, in some embodiments, torque demand).

At process 408, the controller 122 determines whether the system characteristics are within a desired range. For example, the controller 122 may determine that an oxygen content of the exhaust gas is above an upper oxygen threshold thereby indicating that thermal runaway may occur. Conversely, the controller 122 may determine that the oxygen content of the exhaust gas is below a lower oxygen threshold thereby indicating that PM burn off may not occur (i.e., insufficient oxygen content for combustion). As yet another example, the controller 122 may determine that a temperature of the particulate filter 118 is above an upper temperature threshold, which may also indicate that thermal runaway may occur. If the controller 122 determines that the characteristic are within the desired range at 408, the method 400 proceeds to process 410, where the engine 102 continues operation without any changes. The method 400 then returns to process 406 to continue monitoring the characteristics of the particulate filter 118.

If, at process 408, the controller 122 determines that the characteristics are not within the desired range and/or satisfying one or more thresholds (e.g., above or below), the controller 122, at process 412, alters the system operations. Altering the system operations may include any combination of the controller 122 commanding the valve actuation system 126 to alter engine operating parameters, commanding the EGR system 109 to alter the amount of exhaust gas recirculated into the active cylinders of the engine, commanding the hydrocarbon dosing system 116 to alter the amount of hydrocarbon dosing, altering the AFR, and the like. For example, if the controller 122 determines that the temperature within the particulate filter 118 and/or of the exhaust gas is above the desired upper temperature threshold, the controller 122 may command the valve actuation system 126 to activate at least one of the deactivated cylinders, thereby decreasing the exhaust gas temperature. Activating deactivated cylinders (i.e., increasing the firing fraction) functions to reduce exhaust gas temperatures (by requiring less power from the active cylinders) and increase oxygen content from an increased mass flow rate. As another example, if the controller 122 determines that the temperature within or regarding the particulate filter 118 and/or of the exhaust gas is below the desired range, the controller 122 may command the valve actuation system 126 to deactivate at least one of the active cylinders (i.e., reduce the firing fraction), thereby increasing the exhaust gas temperature. The temperature within or regarding the particulate filter 118 may be below the desired range if the convective heat transfer out of the particulate filter 118 exceeds the heat transfer (e.g., from the exhaust gas) into the particulate filter 118. Reducing the firing fraction also reduces the oxygen output which may prevent against potential thermal runaway events.

As yet another example, if the controller 122 determines that the oxygen content within the particulate filter 118 and/or of the exhaust gas is above the upper oxygen threshold, the controller 122 may command the valve actuation system 126 to deactivate at least one of the activated cylinders, thereby decreasing the oxygen content in the exhaust gas emitted from the engine. As yet another example, if the controller 122 determines that the oxygen content within the particulate filter 118 and/or of the exhaust gas is below the lower oxygen threshold, the controller 122 may command the valve actuation system 126 to open an intake and/or an exhaust valve of at least one of the deactivated cylinders, thereby increasing the amount of oxygen in the exhaust gas. Combustion may still be prevented due to deactivating fuel injection in that cylinder, but additional oxygen is added to the exhaust gas stream. As yet another example, if the engine 102 is already operating at a minimum firing fraction, but the temperature is still below a desired range, the hydrocarbon dosing system 116 may be commanded by the controller 122 to dose or inject hydrocarbons (e.g., fuel) to increase the temperature.

As mentioned above and in some embodiments, the adjustment of the firing fraction is not limited to a fixed number of cylinders. In this regard and as indicated above, in some embodiments, the firing fraction is the number of times a cylinder is fired divided by the number of firing opportunities which can then lead to partial fractions. Thus, the controller 122 may adjust the firing fraction in smaller steps up or down than a whole cylinder. For example, if the engine is currently operating at a firing fraction of ⅔ on a 6-cylinder engine (4 cylinders), and the controller 122 determines that the oxygen content or level is above a higher oxygen threshold, the controller 122 may adjust the firing fraction downward to be, for example, ⅗ (3.6 cylinders on average) instead of dropping down to 3 (e.g., by at least partly closing an intake and an exhaust valve of an activated cylinder to reduce oxygen content from the activated cylinder to the aftertreatment system). Similarly, on a 4-cylinder engine, the controller 122 may adjust down from, from for example, ½ (2-cylinders) to a firing fraction of ⅓ (1.33 cylinders on average) instead of a firing fraction of ¼ (1 cylinder). Thus, the controller 122 may drop a fraction of a cylinder to adjust exhaust gas O2 levels to the right or approximately the right amount without cooling down the exhaust gas too much by increasing flow more than necessary. The controller 122 may operate similarly when the oxygen level is at or below the lower oxygen threshold. For example, the controller 122 may open or cause an opening of the exhaust valve of a cylinder without fully activating the cylinder. In this regard, the controller 122 may at least partially open or close at least one valve (e.g., an exhaust valve and an intake valve) to affect the temperature of the exhaust gas provided to the aftertreatment system, the oxygen content in the exhaust gas provided to the aftertreatment system, and/or a combination thereof.

As yet another example, the controller 122 may adjust the AFR to meet the power demands of the system 100 subject to the temperature of the particulate filter for regeneration to beneficially enable regeneration yet mitigate against thermal runaway. For example, if the temperature regarding the particulate filter is below a predefined regeneration temperature threshold, the controller 122 may command a lean AFR for the active cylinders such that additional oxygen is provided to the aftertreatment system to promote higher temperatures for regeneration. If, however, the temperature is above a predefined regeneration temperature threshold, the controller 122 may adjust the AFR for the active cylinders away from lean AFRs to more rich AFRs in order to reduce oxygen content in the aftertreatment system. Additionally, the controller 122 may control an amount of EGR provided to the active cylinders to further control combustion temperatures for particulate filter regeneration. To control the AFR, the controller 122 may adjust fueling (e.g., quantity, rate, etc.), position of an intake air valve to control an intake air amount, a combination thereof, and so on. Adjusting the AFR may adjust oxygen amount emitted from the active cylinders which may be utilized by the controller 122 to control thermal runaway.

Figure 5:
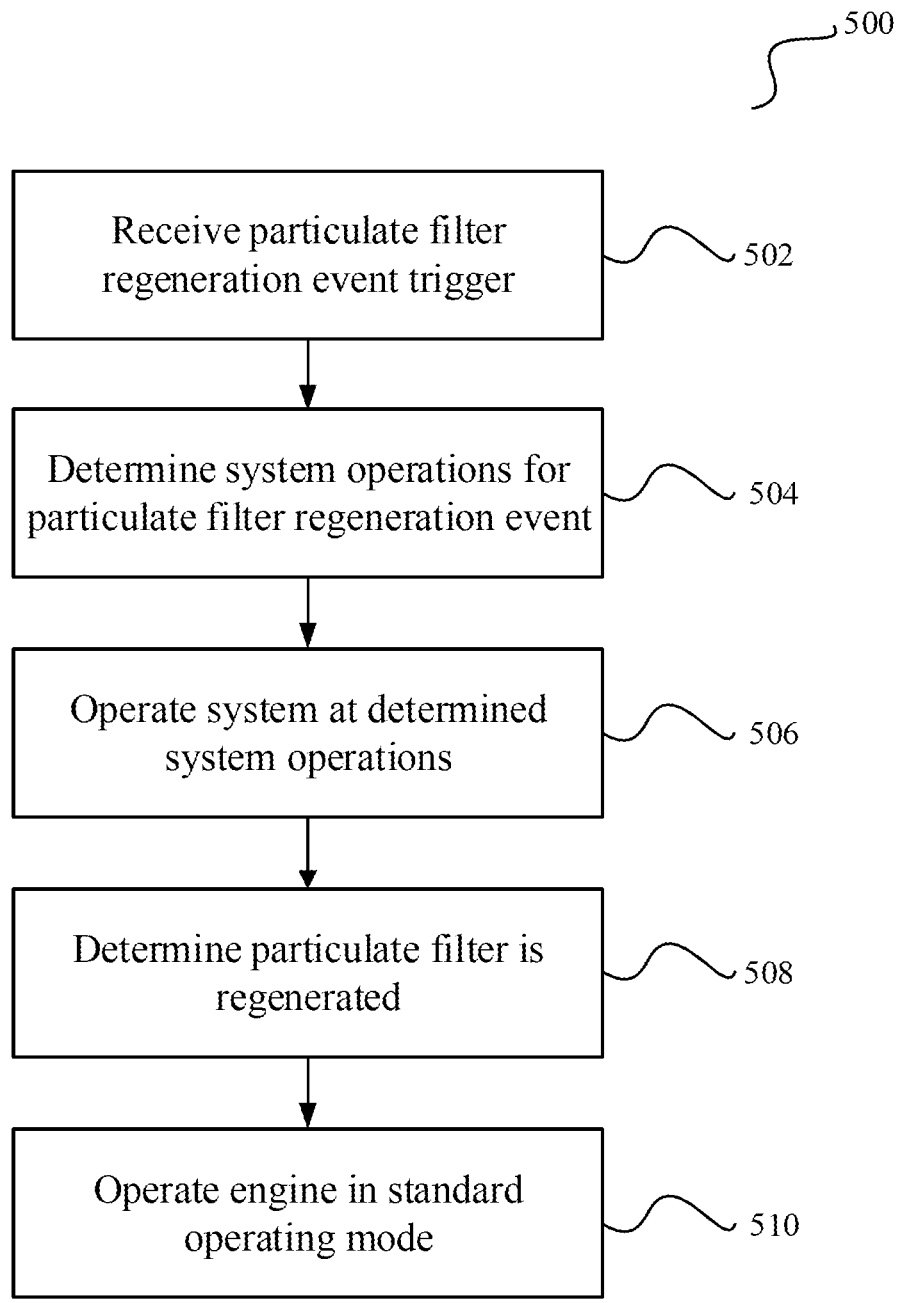
FIG. 5 is flow diagram for determining system operations for a particulate regeneration event, according to a particular embodiment.

Referring now to FIG. 5, a flow diagram of a method 500 of determining system operations for a particulate filter regeneration event is shown, according to an exemplary embodiment. At process 502, the controller 122 receives a particulate filter regeneration event trigger as described in reference to process 302 of FIG. 3.

At process 504, the controller 122 determines system operations for the particulate filter regeneration event. In particular, the controller 122 determines system operations that may include a CDA operating mode for the engine 102 and the operations of the components of system 100. The CDA operating mode may be DSF, fixed cylinder, or another type of CDA operating mode. As part of the CDA operating mode, the controller 122 may determine a firing fraction (as described in reference to FIG. 3) so that the system operations results in an effective particulate filter regeneration event. The controller 122 may further determine the operation of the EGR system 109 (e.g., adjust the amount of EGR recirculated, etc.), the hydrocarbon dosing system 116 (e.g., increasing the amount of hydrocarbons dosed to increase particulate filter 118 temperature, decreasing the amount of hydrocarbons dosed to decrease particulate filter 118 temperature, etc.), the valve actuation system 126 (e.g., opening valves of deactivated cylinders to increase oxygen content in exhaust flow, closing valves of deactivated cylinders to decrease oxygen content in exhaust flow, etc.), and/or other components of system 100 (e.g., adjusting an intake valve to adjust an AFR, etc.).

At process 506, the controller 122 implements the determined system operations by commanding the valve actuation system 126 to operate the engine 102 in the determined CDA operating mode and the determined operations of the components of system 100. Process 506 may include the controller 122 monitoring the system characteristics, determining that the system characteristics are within a desired range, and/or altering the system operations as described in reference to FIG. 4.

At process 508, the controller 122 determines that the particulate filter 118 is regenerated. This determination may be by the controller 122 receiving data from sensors 120 and determining, based on the received data that the operating characteristics (e.g., pressure differential, etc.) meet or exceed desired acceptable thresholds (e.g., a pressure differential within a predefined acceptable range, an exhaust gas flow rate meeting or exceeding a threshold rate at various operating conditions, effectiveness of the filter or other aftertreatment system component exceeding a threshold level, a combination thereof, and so on). In some embodiments, this determination may occur after a predetermined amount of time. For example, in some embodiments, the regeneration event may correspond with a predefined amount of time while, in other embodiments, the regeneration event may correspond with one or more of the determinations described above. At process 510, once the particulate filter 118 is regenerated, the controller 122 commands the valve actuation system 126 to operate the engine 102 in a standard operating mode (e.g., all cylinders active). In some embodiments, the controller 122 may command the valve actuation system 126 to operate the engine 102 in a CDA operating mode according to a base map (e.g., map not corresponding to particulate filter regeneration) during normal operation.

As utilized herein with respect to numerical ranges, the terms "approximately," "about," "substantially," and similar terms generally mean +/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled direction to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that circuit A communicates directly with circuit B (i.e., no intermediary) or communicates indirectly with circuit B (e.g., through one or more intermediaries).

While circuits with particular functionality is shown in FIG. 2, it should be understood that the controller 122 may include any number of circuits for completing the functions described herein. For example, the activities and functionalities of certain circuits may be combined in multiple circuits or as a single circuit. Additional circuits with additional functionality may also be included. Further, the controller 122 may further control other activity beyond the scope of the present disclosure.

As mentioned above and in one configuration, the "circuits" may be implemented in machine-readable medium storing instructions for execution by various types of processors, such as the processor 202. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., a local computing system, etc.) or remotely (e.g., as part of a remote server such as a cloud based server). To that end, a "circuit" as described herein may include components that are distributed across one or more locations.

Embodiments within the scope of the present disclosure include program products comprising computer or machine-readable media for carrying or having computer or machine-executable instructions or data structures stored thereon. Such machine-readable media can be any available media that can be accessed by a computer. The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device. Machine-executable instructions include, for example, instructions and data which cause a computer or processing machine to perform a certain function or group of functions.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present disclosure may be written in any combination of one or more other programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims. Additionally, any element disclosed in one embodiment may be incorporated or utilized with any other embodiment disclosed herein.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system, comprising:
a controller coupled to an engine and an aftertreatment system, the controller configured to:
receive a regeneration event trigger comprising a pressure value regarding a filter of the aftertreatment system being above a pressure threshold;
receive information comprising a temperature regarding the filter of the aftertreatment system based on receiving the regeneration event trigger; and
responsive to determining that the temperature regarding the filter is below a temperature threshold, command the engine to operate according to a first firing fraction, the first firing fraction defining a number of active cylinders of the engine relative to a total number of cylinders of the engine, and the first firing fraction corresponding to a predetermined temperature value of the filter.

2. The system of claim 1, wherein the information further comprises oxygen data indicative of an oxygen amount in exhaust gas during a predetermined time period.

3. The system of claim 2, wherein the controller is further configured to open an exhaust valve of at least one deactivated cylinder responsive to determining the oxygen amount is below a lower oxygen threshold.

4. The system of claim 2, wherein the controller is further configured to command the engine to operate according to a second firing fraction, different from the first firing fraction, responsive to determining the oxygen amount is above an upper oxygen threshold.

5. The system of claim 1, wherein the filter is a diesel particulate filter.

6. The system of claim 1, wherein the controller is further configured to:
subsequent to commanding the engine to according to the first firing fraction, determine that the temperature regarding the filter is below the temperature threshold; and
command the engine to operate according to a second firing fraction, different from the first firing fraction.

7. The system of claim 1, wherein the controller is configured to receive the information responsive to the pressure value being above the pressure threshold, and the pressure value is a pressure differential across the filter.

8. The system of claim 1, wherein the aftertreatment system further includes a hydrocarbon dosing system.

9. The system of claim 1, wherein the system is disposed in a vehicle, wherein the controller is configured to receive the information responsive to the vehicle having traveled a predetermined distance.

10. The system of claim 1 wherein the controller is configured to receive the information responsive to the system operating for a predetermined amount of time.

11. A method comprising:
receiving a regeneration event trigger comprising a pressure value regarding a filter of an aftertreatment system being above a pressure threshold;
receiving information associated with the filter of the aftertreatment system based on receiving the regeneration event trigger, the information comprising a temperature regarding the filter, and the aftertreatment system coupled to an engine; and
responsive to determining that the temperature regarding the filter is below a temperature threshold, commanding the engine to operate according to a first firing fraction, the first firing fraction defining a number of active cylinders of the engine relative to a total number of cylinders of the engine.

12. The method of claim 11, wherein the information is received responsive to a system comprising the aftertreatment system operating for a predetermined amount of time.

13. The method of claim 11, wherein the information further comprises oxygen data indicative of an oxygen amount in exhaust gas emitted from the engine during a predetermined time period.

14. The method of claim 13, further comprising opening an exhaust valve of at least one deactivated cylinder in response to determining the oxygen amount is below a lower oxygen threshold.

15. The method of claim 13, further comprising commanding the engine to deactivate at least one cylinder according to a second firing fraction, responsive to determining the oxygen amount is above an upper oxygen threshold.

16. The method of claim 15, wherein the filter is a diesel particulate filter.

17. A system comprising:
a processor; and
a memory coupled to the processor, the memory storing instructions therein that, when executed by the processor, cause operations comprising:
receiving a regeneration event trigger comprising a pressure value regarding a filter of an aftertreatment system being above a pressure threshold;
receiving information comprising a temperature regarding the filter of the aftertreatment system based on receiving the regeneration event trigger, the aftertreatment system coupled to an engine; and responsive to determining that the temperature regarding the filter is below a temperature threshold, commanding the engine to operate according to a firing fraction, the firing fraction defining a number of active cylinders of the engine relative to a total number of cylinders of the engine.

18. The system of claim 17, wherein the information further comprises oxygen data indicative of an oxygen amount in exhaust gas emitted from the engine during a predetermined time period.

19. The system of claim 18, wherein the instructions, when executed by the processor, further cause operations comprising opening an exhaust valve of at least one deactivated cylinder responsive to determining the oxygen amount is below a lower oxygen threshold.

20. The system of claim 18, wherein the instructions, when executed by the processor, further cause operations comprising commanding the engine to deactivate at least one cylinder according to a second firing fraction, responsive to determining the oxygen amount is above an upper oxygen threshold.

* * * * *